Figure 1:
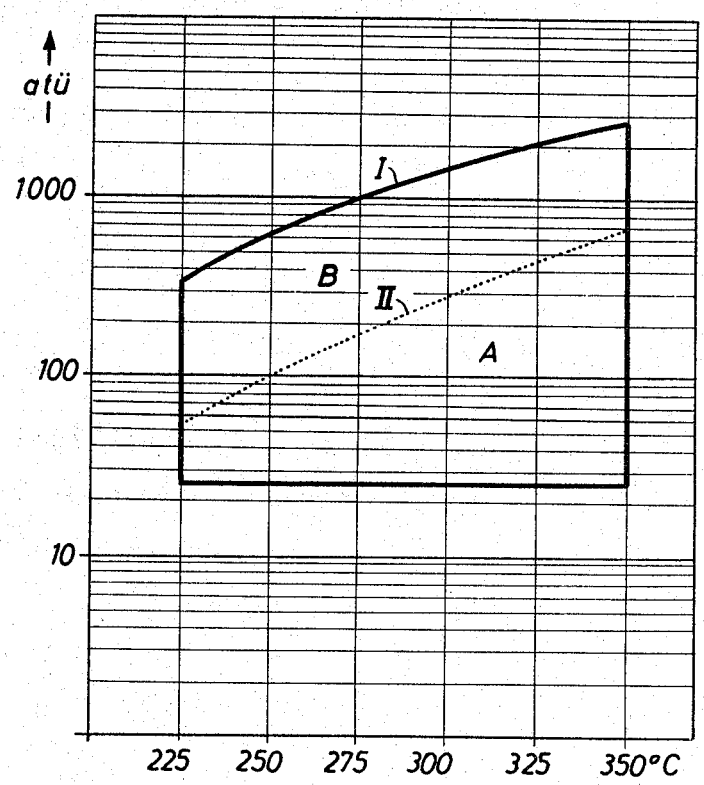

3,310,600
PROCESS FOR THE CONTINUOUS POLYMERIZATION OF ETHYLENE TO FORM PREDOMINANTLY STRAIGHT-CHAIN ALPHA-OLEFINIC POLYMERS HAVING FROM 4 TO 20 CARBON ATOMS

Karl Ziegler, Kaiser-Wilhelm-Platz 1, Mulheim (Ruhr), Germany, and Kurt Zosel, Oberhausen, and Roland Streck, Essen-Steele, Germany; said Zosel and said Streck assignors to said Ziegler
Filed Nov. 14, 1961, Ser. No. 152,298
Claims priority, application Germany, Nov. 19, 1960, Z 83,671
1 Claim. (Cl. 260—683.15)

This invention relates to a process for the continuous polymerization of ethylene to form predominantly straight-chain alpha-olefinic polymers having from 4 to 20 carbon atoms.

It has been disclosed in German Patent 878,560 that ethylene can be polymerized to form higher olefins, i.e. so-called oligomers, by heating ethylene together with aluminum trialkyls. In general, this results in mixtures of olefins of different molecular sizes and different structures. To be found in the above-mentioned oligomers are straight-chain alpha olefins, olefins having the double bond in the center of the chain, and branched-chain olefins having the general formulae

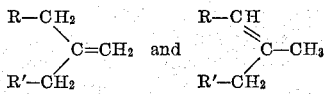

wherein R and R' are alkyl

It can be achieved by special embodimets of this process that uniform reaction products are formed. Thus, the process of German Patents 964,642 and 1,001,981 gives predominantly alpha butylene when activating aluminum triethyl with some colloidal nickel and then heating it with ethylene to about 120° C., and mixtures of straight-chain alpha olefins containing 6, 8, 10 and more carbon atoms can be produced by the so-called two-stage process of German Patent 1,034,169. In the latter case, a higher aluminum alkyl is first "grown" from a lower aluminum alkyl by the addition of ethylene effected under mild conditions of temperature (about 120° C.) and in the absence of any co-catalyst, particularly in the absence of nickel, and then olefins are split off from this higher aluminum alkyl with ethylene in the presence of nickel with reformation of aluminum triethyl, said splitting being effected in a separate apparatus.

For the synthesis of the next polymer homologues of ethylene, i.e. perhaps of butene, hexene, octene and the like, all of these processes suffer from certain disadvantages. The two-stage mode of operation even in its best embodiment requires increased investment due to the two different apparatus necessary for the two stages. The one-stage polymerization of ethylene in the presence of aluminum-organic catalysts takes a uniform course merely in the simplest case, i.e. in the production of butylene according to German Patents 964,642 and 1,001,981, but the space-time yield of this reaction is not very high. At an ethylene pressure of 40 atmospheres, it ranges between about 30 and 100 gms. of alpha butylene per hour per liter of pressure-resistant reaction space. An attempt to increase the rate by increasing the temperature results in alpha butylene which is contaminated with beta butylene to an increasing extent and which cannot be used for so many applications as pure alpha butylene.

The course of the aluminum alkyl-catalyzed polymerization of ethylene is discussed by K. Ziegler in a publication (Zeitschrift für Angewandte Chemie, 64, 328 (1952)). He reports that alpha olefins are predominantly obtained when selecting the appropriate residence time in a continuous process, using a temperature not in excess of 200° C. if possible and, moreover, preferably admixing certain ethers to the aluminum alkyls thereby reducing the activity of the aluminum trialkyls due to the formation of so-called etherates. Due to this reduction in reactivity, the predominant formation of alpha olefins can, of course, only be achieved with a concomitant considerable decrease in space-time yield.

However, the one-stage polymerization of ethylene by means of aluminum alkyl exhibits a further deficiency. When producing ethylene polymers by this process, products having a very unfavorable flat distribution of molecular sizes are obtained as a rule. The theory of this polymerization indicates that the distribution follows a law $$X_p = \frac{\beta}{(1+\beta)^p}$$

wherein $X_p$ is the molar fraction of olefins which have the composition $$CH_2=CH-(C_2H_4)_{p-1}-C_2H_5$$

in the reaction mixture (ethylene ($p=0$) is not included) and wherein $\beta$ is the ratio of the frequency of the so-called displacement acts to the frequency of growth steps. It can be easily derived from this formula that for $\beta>2$ butylene must be produced predominantly and that only in a very narrow range of values for $\beta$ of between about 2 and 0.5 olefin mixtures can be produced, the distribution of which is not too complicated. For example, for $\beta=2$, the following composition of the polymer:

| | Wt. percent |
|---|---|
| $C_4$ | 53.3 |
| $C_6$ | 26.7 |
| $C_8$ | 11.8 |
| $C_{10}$ | 4.94 |
| $C_{12}$ | 1.98 |
| $C_{14}$ | 0.77 |
| $C_{16}$ | 0.29 |
| $C_{18}$ | 0.11 |
| $C_{20}$ | 0.04 |
| $>C_{20}$ | 0.07 | and for $\beta=1$ the following composition of the polymer can be expected:

| | Wt. percent |
|---|---|
| $C_4$ | 33.3 |
| $C_6$ | 25.0 |
| $C_8$ | 16.7 |
| $C_{10}$ | 10.4 |
| $C_{12}$ | 6.25 |
| $C_{14}$ | 3.64 |
| $C_{16}$ | 2.08 |
| $C_{18}$ | 1.17 |
| $C_{20}$ | 0.65 |
| $>C_{20}$ | 0.8 |

Since only or almost only butylene is produced in the range from $\beta=\infty$ to $\beta=2$ and polymers comprising a great number of small individual fractions of different degrees of polymerization are formed in the similarly wide range between $\beta=0.5$ and $\beta=1/\infty$, it is understandable that, in single-stage polymerizations, either only butylene or less valuable polymers having a wide distribution are generally obtained. It is not quite easy to meet exactly the narrow and particularly interesting range between $\beta=2$ and $\beta=0.5$.

The two-stage polymerization gives reaction products showing the so-called Poisson distribution (cf. H. Weslau, Liebigs Annalen der Chemie, 629, 198 (1960)) which is more favorable for practical purposes, and this is one of the reasons why, apart from the synthesis of butylene, the two-stage mode of operation was exclusively considered up to the present for carrying out the process in practice.

The invention relates to the production of the lower, predominantly straight-chain and alhpa-olefinic polymer homologues of ethylene from butylene to about eicosene, said polymer homologues being also uniform in the case of alpha butylene but otherwise in the form of mixtures. These olefin mixtures of components of limited molecular size exhibit the particular property of being capable of being easily separated into the individual components by distillation without an excessively high expense of apparatus. Therefore, the production of such a mixture offers advantages over the synthesis of mixtures comprising still more and higher components if it is desired to obtain starting materials for the production of uniform reaction products.

The invention permits the production of alpha butylene or corresponding reaction products with a considerably higher space-time yield than that obtainable up to the present. This is achieved in accordance with the invention by continuous polymerization of ethylene in the presence of aluminum-organic compounds with an appropriate combination of the variables, i.e. pressure, temperature and residence time. In contrast to the earlier recommendation by K. Ziegler, the particularly reactive ether-free organo-aluminum compounds are used as the catalysts without any additional cocatalyst. The temperatures are sufficiently high that very high reaction rates are obtained which are many times higher than those previously considered possible, the optimum temperatures ranging between about 250 and 320° C.

An essential feature of the invention is illustrated by the pressure-temperature diagram shown on the appended FIG. 1 where the pressure is plotted on a logarithmic ordinate vs. the temperature, and two limiting lines I and I are shown. These correspond to $\beta$ values of 2 and 0.5. The area above I is uninteresting from the commercial point of view because it leads to polymers which have an excessively wide distribution. Below the line II, in the area A, butylene is substantially produced, and defined by I and II is the area B which corresponds to the formation of olefin mixtures having compositions which are not excessively complicated. Thus, the invention is characterized by the selection of a pressure-temperature combination located between I and II or below II. However, another decisive factor is the residence time. The latter should range in the order of magnitude between 0.1 second and about 10 minutes but it will be easily understood that no arbitrary combinations of pressure, temperature and residence time are possible.

The quantity of ethylene oligomer formed per unit volume of a continuously operated reactor depends upon not less than four variables: pressure, temperature, residence time in the heated reaction zone, and quantity of catalyst (in relation to the amount of ethylene). If a stream of ethylene under an elevated pressure is recirculated through a long heated tube and very little aluminum triethyl is initially injected continuously at the inlet, then only a few percent of the ethylene are converted into olefins. However, when increasing the supply of catalyst, the rate of conversion initially increases proportionally or approximately proportionally with the amount of catalyst and finally approaches 100%, this approach being no longer proportional but asymptotic. The quantity by weight of ethylene oligomers produced per unit time in a given reactor volume passes through a maximum approximately at a weight ratio of ethylene to catalyst of 3:1 to 2:1. It is not necessary as a rule to go below about 10:1. Under favorable conditions, about 100:1 and even 1000:1 will be sufficient. The use of relatively large amounts of catalyst is easily possible since the catalyst can be separated very easily from the oligomers by partial condensation or by distillation and recycled into the reactor. The continuous losses of catalyst (caused substantially only by impurities in the ethylene and discussed below) are very low. On the other hand, when using amounts of catalyst of 0.1 to 1%, the recovery may be dispensed with. The lower limit of the amount of catalyst is otherwise only fixed by the degree of purity of the ethylene since small proportions of certain impurities (water, oxygen, $CO_2$, CO, sulfur compounds) destroy a corresponding amount of the catalyst so that the catalytic action will not take place until the amount of catalyst exceeds a threshold value.

Figure 2:
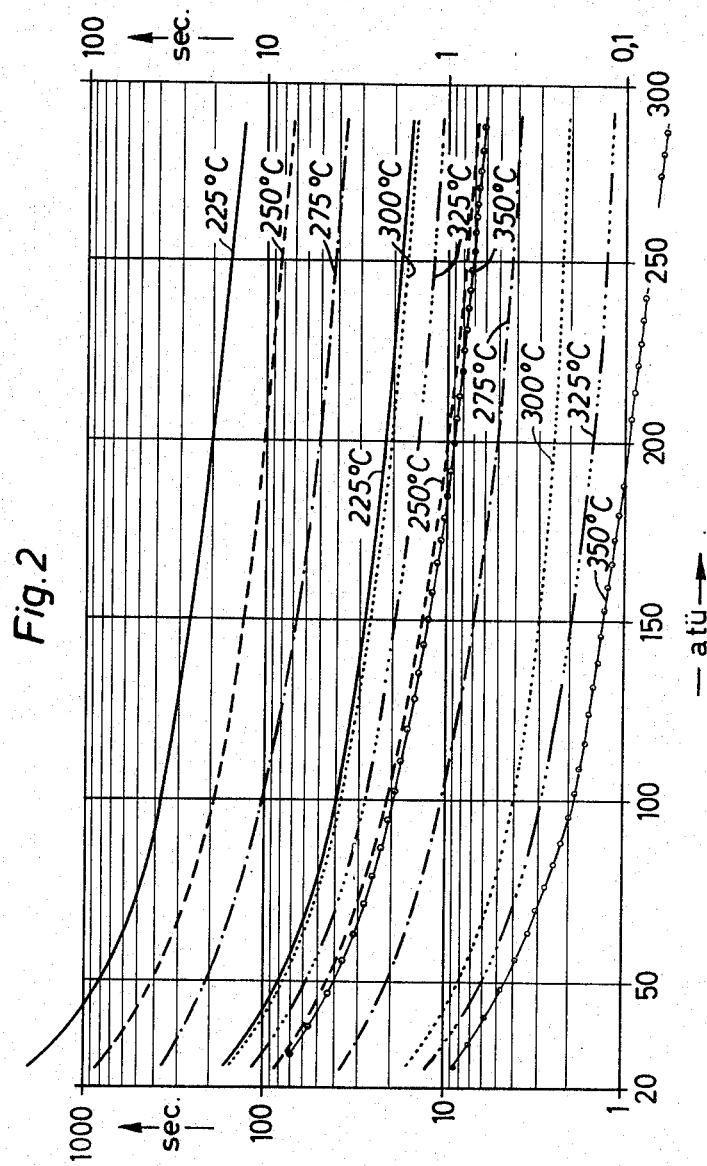

The residence imes to be used in accordance with the invention can be easily estimated from the diagrams of the appended FIG. 2. These consist of a total of six pairs of curves for the temperatures of 225° C., 250° C., 275° C., 300° C., 325° C., 350° C., which curves represent the ranges of optimum residence times as a function of the pressure, the upper curves corresponding to the upper limits and the lower curves corresponding to the lower limits in each case. The (logarithmic) ordinate is provided with two scales which differ by the factor 10, the higher scale being intended for a weight ratio of ethylene/aluminum triethyl of about 100:1, the lower one for a weight ratio of about 10:1. Intermediate values can be easily estimated from the graphs. When increasing the amount of catalyst up to ratios of 5:1 and 3:1, the residence times will again be divided by 2 and 3, respectively. When using less catalyst than corresponds to a ratio of 100:1, they must be increased correspondingly. If, in a given case, a residence time at the lowermost possible limit is used, a conversion rate in the order of about 5 to 15% will be obtained. At the upper limit, a conversion rate of about 50 to 90% can be expected. Of course, the curve pairs of the graphs are not intended to define sharp limits but only indicate the ranges which are desirable in accordance with the invention. Certain deviations in upward or downward direction are not excluded.

Continuous performance of the reaction is characteristic of the invention. Suitable for continuous operation are only those reactors which permit rapid removal of the considerable heat of polymerization (about 400 to 700 kilogram calories per kg. of ethylene depending upon the average degree of polymerization). The reactors should have a considerable length in relation to the free diameter and their surface area per ml. of volume should not be smaller than 1 sq. cm. and preferably range between about 2 and 10 sq. cm. provided that a material of high thermal conductivity is used. The reactors may have the form of tubes which are preferably coiled or they may consist of concentrically arranged twin tubes which are internally and externally cooled by a cooling medium. It is also possible, of course, to combine a multiple number of such individual tubes arranged in parallel to form large reactors.

The invention permits the production of as much as 20 kgs. and more of ethylene oligomers per liter of reactor per hour. This represents an extremely high efficiency which is practically only limited by the necessity of preventing accumulation of heat. Therefore, each reactor type exhibits a definite maximum capacity in kgs. of oligomers per liter of volume, this capacity being dependent upon the specific characteristics of the reactor with respect to heat transfer and heat removal and being achievable or utilizable from the side of the reaction, e.g. by appropriately adjusting the ratio of ethylene to catalyst.

The investment of equipment necessary for the process, when only considering the conditions in the synthesis of alpha butylene from ethylene, is higher than that necessary, for example, for the conversion of ethylene into butylene at atmospheric pressure by the process of German Patent 1,018,857. However, in this process, the activity of the catalyst decreases relatively rapidly, the space-time yield (about 200 gms./liter/hr.) is comparatively low, and the butene obtained contains about 30% of β-butene. The heat of polymerization of ethylene is completely lost (at a polymerization temperature of below 100° C.). In contrast to this, the polymerization at temperatures of 225 to 350° C. and with a high throughput offers the advantage that the heat of polymerization can be recovered in a highly valuable form, e.g. in the form of superheated process steam having a temperature of 200 to 300° C. (4 tons of oligomers correspond to about 1 ton of superheated steam), which permits a marked reduction in operating costs.

The catalyst used in the process of the invention is aluminum triethyl. When using other aluminum trialkyls or dialkyl hydrides, these are immediately converted into aluminum triethyl by reaction with ethylene in the reactor. The same is true for diethyl aluminum hydride.

The aluminum triethyl may also be used in mixture with compounds of the type $(C_2H_5)_2AlX$ wherein X is halogen or alkoxyl. This dilution with other aluminum compounds which are inactive as catalysts may be recommendable when operating with very low catalyst contents because this permits better proportioning of the catalyst. Other suitable diluents for the catalyst are hydrocarbons or the reaction products themselves, part of which can be returned into the reaction together with the catalyst mixture without detrimentally affecting the further reaction products.

Figure 3:
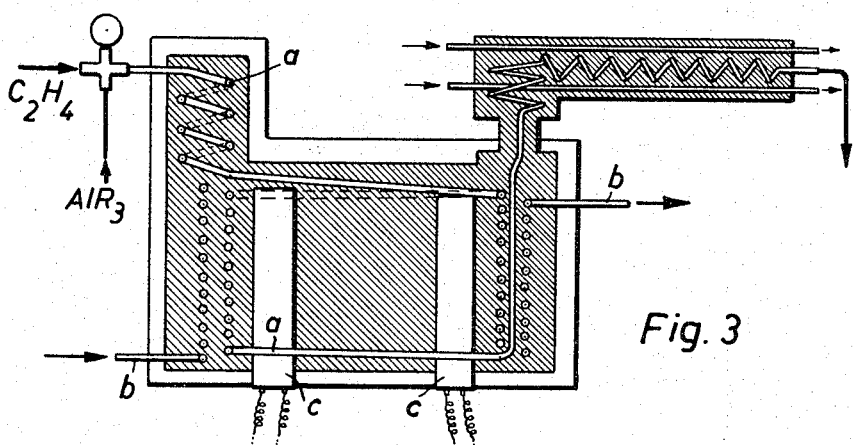

The Examples 1 to 13 summarized in a table were carried out in reactors which are shown in the appended FIG. 3. The reaction itself takes place in a long coiled steel tube $a$ which, together with a second similar tube $b$, is embedded in a block of cast aluminum. The initial part of the tube $a$ is wound to a narrower spiral which functions as a preheater of the ethylene in operation. The end of the reaction tube is again coiled to a narrower spiral and embedded in cast aluminum together with further steel tubes through which cooling water can be circulated in operation. Also embedded in the main aluminum block are heating elements $c$ by means of which the whole assembly can be brought to the reaction temperature at the beginning of the run. After the polymerization has been initiated, the heating elements are switched off and a suitable cooling medium is passed through the block, this cooling medium being preferably saturated steam which emerges as superheated steam. It is possible by appropriately controlling the steam flow rate or by replacing the steam by injected water or by introducing a mixture of steam and water to maintain the reactor block at any temperature desired within wide limits. After having left the main reaction zone, the reaction mixture must be chilled very rapidly because otherwise unreacted ethylene could continue to react with the aluminum alkyl in an undesirable manner.

Different size reactors of the type described have been used, viz. a 500 ml. reactor having a reactor tube of 15 m. in length and 6.5 mm. in inside diameter, a 200 ml. reactor having a reactor tube of 10 m. in length and 5 mm. in inside diameter, and a 2000 ml. reactor having a reactor tube of 40 m. in length and 8 mm. in inside diameter.

The gas streams emerging in the individual runs were depressurized to 2 to 3 atmospheres into a tank which was cooled to about 0° C. In doing so, the bulk of the reaction products separated in liquefied form and could be drained from time to time. The ethylene was then returned to the suction side of a compressor and recycled into the apparatus. Fresh ethylene was supplied to the suction side of the compressor to make up for the ethylene consumed. The liquid reaction products were then driven off from the catalyst in a column and the catalyst was returned into the process by means of a liquid injection pump. The results of experiments of the kind described are summarized in the following table.

TABLE

| Example No. | 1 | 2 | 3 | 4 | 5 | 6 | 7 | 8 | 9 | 10 | 11 | 12 | 13 |
|---|---|---|---|---|---|---|---|---|---|---|---|---|---|
| Capacity of reactor, ml | 500 | 500 | 200 | 200 | 200 | 200 | 200 | 200 | 200 | 2,000 | 500 | 500 | 500 |
| Pressure, kg./cm.² guage | 25 | 25 | 50 | 50 | 75 | 100 | 100 | 150 | 200 | 200 | 100 | 150 | >300 |
| Temperature, °C | 300 | 300 | 300 | 350 | 300 | 300 | 320 | 300 | 260 | 260 | 225 | 250 | 250 |
| Kgs. $C_2H_4$/hr | 1.4 | 2.8 | 6.5 | 5 | 9 | 30 | 10.4 | 8.5 | 6.5 | 6.5 | 7 | 5.5 | 5.5 |
| Kgs. Al trialkyl/hr | 0.14 | 0.8 | 0.1 | 0.1 | 0.8 | 1.2 | 0.4 | 0.1 | 0.02 | 0.02 | 0.1 | 0.5 | 0.2 |
| Percent catalyst | 10 | 28 | 1.5 | 2 | 9 | 4 | 3.8 | 1.2 | 0.3 | 0.3 | 1.4 | 9.1 | 3.7 |
| Residence time, seconds | 29 | 10 | 3.6 | 4 | 3.6 | 1.5 | 4.2 | 8.3 | 15 | 150 | 16 | 33 | 65 |
| Product, kgs./hr | 0.7 | 2.0 | 0.4 | 1.0 | 3.5 | 2.1 | 4.2 | 2.3 | 0.24 | 2.0 | 0.16 | 2.8 | 4.5 |
| Ethylene reacted, percent | 52 | 70 | 6.1 | 20 | 39 | 7 | 40 | 27 | 3.7 | 31 | 2.3 | 51 | 82 |
| Composition of olefins | bu | bu | bu | bu | bu | bu | bu | bu | ol | ol | ol | ol | ol |

The Examples 1 to 8 designated with "bu" in the last line correspond to the pressure and temperature combination of the area A of FIG. 1. They yield practically only butylene which, in a few cases, was mixed with a few percents of hexene and octene. Very sensitive gas analyses revealed the product to be pure alpha butene.

The runs 9 to 13 designated with "ol" in the last line were carried out with the pressure and temperature combinations of the area B of FIG. 1. The composition is illustrated below by way of example by the following data: The compostion of the free olefins was as follows:

Examples 9 and 10:

|  | Wt. percent |
|---|---|
| $C_4$ | 33 |
| $C_6$ | 25 |
| $C_8$ | 17 |
| $C_{10}$ | 11 |
| $C_{12}$ | 6.5 |
| $C_{14}$ | 4 |
| $C_{16}$ | 2 |
| $C_{18}$ | 1.0 |
| $C_{20}$ | 0.5 |

Example 11:

|  | Wt. percent |
|---|---|
| $C_4$ | 36 |
| $C_6$ | 25.7 |
| $C_8$ | 16.3 |
| $C_{10}$ | 9.7 |
| $C_{12}$ | 5.6 |
| $C_{14}$ | 3.1 |
| $C_{16}$ | 1.7 |
| $C_{18}$ | 0.9 |
| $C_{20}$ | 0.5 |
| $>C_{20}$ | 0.5 |

Example 12:

|  | Wt. percent |
|---|---|
| $C_4$ | 39.1 |
| $C_6$ | 26.1 |
| $C_8$ | 15.5 |
| $C_{10}$ | 8.8 |
| $C_{12}$ | 4.8 |
| $C_{14}$ | 2.6 |
| $C_{16}$ | 1.3 |
| $C_{18}$ | 0.7 |
| $C_{20}$ | 0.4 |
| $>C_{20}$ | 0.7 |

Example 13:

| | Wt. percent |
|---|---|
| $C_4$ | 20.4 |
| $C_6$ | 19.1 |
| $C_8$ | 15.9 |
| $C_{10}$ | 12.4 |
| $C_{12}$ | 9.3 |
| $C_{14}$ | 6.8 |
| $C_{16}$ | 4.9 |
| $C_{18}$ | 3.4 |
| $C_{20}$ | 2.3 |
| $>C_{20}$ | 5.5 |

In Examples 9 to 13, the olefins from $C_4$ through $C_{10}$, on an average, consisted of 95% of straight-chain alpha olefins, the balance being branched-chain alpha olefins and small amounts of olefins having the double bond in the center of the chain. The olefins from $C_{12}$ to $C_{20}$ still comprise about 90% of straight-chain alpha olefins.

These examples cover the pressure range from 25 to 300 atmospheres, i.e. the upper limit of the pressure range used in these examples is higher than will normally be the case in practice. In practice, the pressure used in runs of this kind will hardly be higher than about 200 atmospheres. The use of higher pressures is not necessary in most cases. However, higher pressures are by no means intended to be excluded. Actually, the upper limit of the pressure is only set by the general restriction that any pressure whatever cannot be realized. However, it may well be possible under certain circumstances to use higher pressures. However, in these cases, apparatus different from those just described for use in the pressure range between 25 and 300 atmospheres will preferably be used. At high ethylene pressures, certain limitations result from the fact that the specific surface area of the reactors cannot be increased at will so that it becomes very difficult to remove the reaction heat, particularly in those cases where the other operating conditions necessitate very short dwell times. It is possible under these conditions to realize the process of the invention according to a quite different principle.

Ethylene is first passed under high pressure through a preheater and then through a capillary which is much shorter than that used in the reactors described above. The catalyst which is likewise preheated and preferably used in dilute form is added at the beginning of these capillaries. An appropriate residence time is adjusted by controlling the flow rate of ethylene and care is taken by the other conditions (particularly by the amount of catalyst) that the conversion rate is maintained in the order of 5 to 15% while the gas stream passes through the capillaries. Under these conditions, the heat of reaction is mainly absorbed by the unreacted ethylene and only a small fraction is removed through the wall of the capillaries. At the end of the short reaction path, either a rapid depressurization is effected or a suitable substance destroying the catalyst or largely decreasing its reactivity is injected (e.g. water or an ether or tertiary amine). In this manner, an uncontrolled temperature increase and therewith an explosive decomposition of the ethylene which is under high pressure is avoided. As an alternative, the substance added may be introduced in amounts sufficient that the ethylene is chilled rapidly. As another possibility, ethylene which, for example, is contaminated with oxygen compounds may be added in suitable amounts at this point in place of the substances mentioned above. This results in a favorable effect in three respects: The reaction is interrupted in the right moment, the reaction mixture is sufficiently cooled, and the fresh ethylene added is purified.

It is self-evident to persons in the art that the temperatures used in accordance with the invention in case of the embodiment of the process described last are not necessarily the same as those with which the ethylene is transferred from the preheater into the reaction zone. In general, the preheater will rather have to be maintained at a temperature which is lower than the reaction temperature desired, and a corresponding increase in temperature will then occur as the ethylene passes through the reaction zone as may be easily measured by means of a thermocouple inserted into this reaction zone proper.

It was already pointed out in the beginning that processes operated at lower pressures are available for the conversion of ethylene into oligomers, and the advantages exhibited by the process of the invention despite the use of higher pressures were explained. Particular advantages are also obtained when combining the process of the invention with other processes where ethylene must be used under high pressure because the compression cost will not constitute a burden on the economy of the process of the invention in this case. A widely known process of this kind is the production of high-pressure polyethylene. As is known, the high-pressure polymerization of ethylene is operated with a rate of conversion of ethylene of about 20%. Eighty percent of the ethylene, after having been purified again, must be recycled into the process if substantially complete conversion of the ethylene available into polyethylene is desired. There are also modifications of the polyethylene process which are not operated with recycling but where the excess ethylene which is somewhat contaminated by oxygen compounds is passed to other processes where the degree of purity is not so essential. Since the subsequent operations in these cases are generally carried out under a substantially lower pressure than that used during the polymerization, the ethylene must be depressurized so that valuable compression energy is lost without utilization. It is obvious that the process of the invention can be inserted very advantageously in such a series of different successively operated processes for the conversion of ethylene. It will be preferable in this case to use modifications of the process of the invention where only little catalyst is used, the loss of which may be put up with the quantity of the catalyst having to be adjusted such that an additional small continuous loss of catalyst by reaction with the oxygen-containing impurities of the ethylene can be tolerated. If, in such a combination of processes, the conversion of ethylene into oligomers according to the invention is also operated with partial conversion only, the excess ethylene will emerge from this process at a purity which is higher than that of the ethylene charged to the process so that the process of the invention may also be used in place of the purification operation for a full cyclic process of the high-pressure polyethylene process.

What is claimed is:

A process for the continuous production of predominantly straight-chain alpha-olefin polymers having from 4 to 20 carbon atoms, which comprises contacting ethylene with aluminum triethyl as catalyst in a reaction zone having a heat removing surface of at least 1 sq. cm. per ml. of capacity at a temperature of from 250 to 350° C., a pressure in excess of 25 atmospheres, and with a contact time varying between 0.1 sec. to 20 min., the said pressure and temperature being determined by reference to the graph of FIG. 1 in dependence on the polymeric products to be produced and using contact times in conjunction with said temperatures and pressures determined from the graph of FIG. 2 as a function of the amount of catalyst used based on ethylene throughput.

References Cited by the Examiner

UNITED STATES PATENTS 1,737,347  11/1929  Wilson.
2,699,457  1/1955  Ziegler et al. _____ 260—683.15

FOREIGN PATENTS 613,103  8/1926  France.
853,187  11/1960  Great Britain.
876,680  9/1961  Great Britain.

PAUL M. COUGHLAN, JR., *Primary Examiner.*

ALPHONSO D. SULLIVAN, *Assistant Examiner.*

UNITED STATES PATENT OFFICE
CERTIFICATE OF CORRECTION

Patent No. 3,310,600　　　　　　　　　　　　　　　March 21, 1967

Karl Ziegler et al.

It is hereby certified that error appears in the above numbered patent requiring correction and that the said Letters Patent should read as corrected below.

In the heading to the printed specification, line 12, for "Z 83,671" read -- Z 8367 --; column 1, line 33, for "embodimets" read -- embodiments --; column 3, line 36, for "and I" read -- and II --; column 4, line 12, for "imes" read -- times --; column 8, line 41, for "proceses" read -- processes --.

Signed and sealed this 7th day of November 1967.

(SEAL)
Attest:

Edward M. Fletcher, Jr.

Attesting Officer

EDWARD J. BRENNER

Commissioner of Patents